D. GREEN.
DISTILLING APPARATUS FOR SPIRITS.
No. 81,624. Patented Sept. 1, 1868.
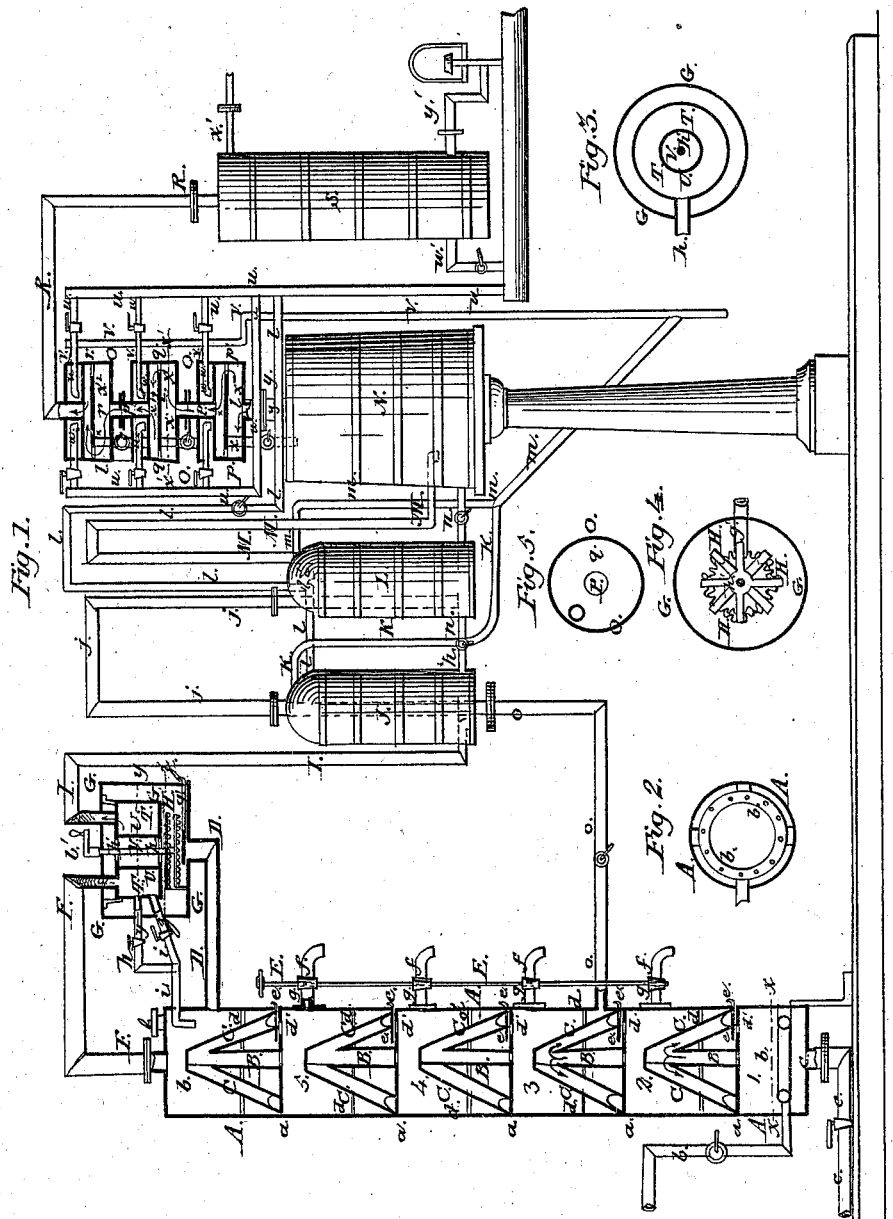

United States Patent Office.

DUBY GREEN, OF NEW YORK, N. Y.

*Letters Patent No. 81,624, dated September 1, 1868.*

IMPROVED DISTILLING-APPARATUS FOR SPIRITS.

*The Schedule referred to in these Letters Patent and making part of the same.*

TO ALL WHOM IT MAY CONCERN:

Be it known that I, DUBY GREEN, of the city, county, and State of New York, have invented a new and improved Distilling-Apparatus; and I do hereby declare that the following is a full, clear, and exact description thereof, which will enable those skilled in the art to make and use the same, reference being had to the accompanying drawings, forming part of this specification, in which—

Figure 1 represents a sectional side elevation of my improved distilling-apparatus.

Figure 2 is a horizontal section of the same, taken on the line $x\,x$, fig. 1.

Figure 3 is a horizontal section of the same, taken on the line $y\,y$, fig. 1.

Figure 4 is a horizontal section of the same, taken on the line $z\,z$, fig. 1.

Figure 5 is a horizontal section of the same, taken on the line $x'\,x'$, fig. 1.

Similar letters of reference indicate corresponding parts.

This invention relates to a new apparatus for distilling alcohol directly from the mash, and consists in a new construction of the boiling-apparatus which contains six, more or less, chambers, one above the other, all communicating with each other, and all producing vapors from the mash contained in them, the lowest chambers, which have the weakest mash, receiving the greatest amount of heat, and the highest the least.

The invention also consists in the arrangement of a new stirring-device, which receives its heat from the vapors that rise from the boiling-apparatus, while heretofore direct steam had to be used for that purpose. In the stirring-apparatus are arranged two stirrers, while heretofore but one was used.

The invention also consists in the arrangement of a new dephlegmating or concentrating-vessel, which is, by means of shelves, divided into several separate chambers, so that the vapors will be brought in contact with a large cooling-surface.

The invention finally consists in connecting all the valves of the boiling-apparatus, in such a manner that they may all be closed and opened simultaneously.

A, in the drawings, represents the boiling-apparatus, made in form of an upright cylindrical vessel, of suitable size and material.

The same is, by means of horizontal partitions or floors, $a\,a$, divided into six (more or less) chambers, 1, 2, 3, 4, 5, and 6.

The lowest chamber, 1, receives the steam from a pipe, $b$, and discharges the spent mash through a pipe, $c$, both of which pipes are provided with suitable cocks, as shown.

The steam-pipe $b$ is, within the boiler, bent into a ring-shaped or spiral form, and is perforated, to equally distribute the steam through the boiler.

Upon each floor $a$ is set a vertical pipe, B, communicating at its open lower end with the chamber below, and near its upper end with downward-leading branches, C C, which are open at their lower ends, so as to discharge the steam rising in the pipe B from the chamber below into the mash in the chamber above.

$d\,d$ are braces for holding and steadying the pipes C and D in their respective chambers.

Each floor $a$, besides being perforated at the lower end of the pipe B, is provided with an aperture, $d'$, which can be closed by means of a sliding plate, $e$, as shown.

The mash enters the uppermost chamber, 6, through a pipe, D, and is boiled by the vapors that enter the chamber 6 from the chamber 5 through the pipes B C. When it has been sufficiently boiled, it is let down into the chamber 5 by withdrawing the slide $e$, and is in the chamber 5 boiled again, by the vapors rising from chamber 4, and so on it is gradually lowered until it is, in chamber 1, brought into direct contact with the steam, where all its best alcoholic contents are taken from it, and whence it is, when spent, discharged through the pipe $c$.

It is evident that the heat in the upper chambers is not as great as that in the lowermost chambers, and thus the mash is, the weaker it gets, exposed to greater heat, to become most thoroughly extracted.

$f\,f$ are discharge-pipes of the chambers 2, 3, 4, and 5. They are all closed by valves, $g\,g$, which are connected by a rod, E, so that they may all be closed and opened at once.

This is a great improvement, as the forgetfulness of the attendants frequently causes the boiler to burst when they forget to open the valve, or much of the liquor to be wasted when they omit to close the same.

By connecting all the valves, the opening and closing will be facilitated.

Through a pipe, F, the alcoholic vapors extracted from the mash escape from the vessel A into the stirring-apparatus G, which contains two stirrers, H H.

The stirring-apparatus consists of two vessels, G and T.

The vessel T is within G, smaller and shorter than the same, and does not come in contact with the sides, top, nor bottom of the same.

Within the vessel T is a circular partition, U, extending from top to bottom of T, and forming an interior vessel, or rather channel, V.

The channel or vessel V is open on top and bottom, as shown in fig. 1.

The vapors do not actually enter G, but are by the pipe F conducted into the annular chamber T, heating the mash which is in G and V, and becoming themselves cooled, so as to have their heavier parts condensed.

The mash is put through an opening in the top of the vessel G into the said vessel G, and surrounds the inside and outside of the annular vapor-chamber T, and becomes somewhat heated by the heated walls of the chamber T. The mash is by the stirrers H thoroughly agitated, and is then carried off to the boiler through the pipe D.

A slide, $g'$, can regulate its passage through the pipe D.

The stirrers are radial arms, connected by means of coiled-wire strands, as indicated in fig. 4. They are either both attached to a vertical shaft, $h'$, or one of them is secured to the shaft, and the other remains stationary.

The pipe D connects the vessels G and A, as shown, and conducts the stirred mash to the latter.

Pipes $h$ and $i$ are arranged on the vessel T, to discharge the products of condensation, and to allow the complete emptying of the apparatus respectively.

Through a pipe, I, the vapors escape from T into the first rectificator J, to the upper compartment of which water is conducted through a pipe, $l$, which water escapes again, when warm, through a pipe, $k$.

A pipe, $j$, conducts the vapors from the first to the second rectificator, L, and a pipe, M, from the second to the third rectificator, N.

The second rectificator receives water from the pipe $l$ and discharges it through a pipe, $m$.

The three rectificators are connected with each other by means of pipes, $n$ $n$, having stop-cocks, as shown, and the first rectificator is, by a pipe, $o$, connected with the vessel A.

Above the third rectificator is a dephlegmator or concentrating-vessel, O, which consists of three (more or less) parts, $p$, $q$, and $r$, all connected with each other by means of sectional pipes, P, and each divided by a horizontal partition, $s$, into two main compartments, of which the upper one, $w$, contains the cooling-liquids, while the vapors pass into and through the lower compartment, $x$, and then through the pipe P into the lower compartments of the part $q$ or $r$ next above, in the manner indicated by arrows in the drawing.

Perforated shelves, $t$ $t$, are arranged in these chambers, to detain the vapors, as shown.

Through pipes $u$ $u$ the water is conducted into the cooling-chambers of the dephlegmator O, and is again discharged through pipes $v$ $v$ when warm.

The dephlegmator O is connected with the third rectificator, H, by means of a pipe, $y$.

From the dephlegmator, the vapors are carried by the pipe R into the worm, which is arranged within a vessel, S, into the lower part of which water is conducted by a pipe, $w'$, which water, when warm, escapes from the top of S through a pipe, $x'$.

From the vessel S the alcohol is drawn through a pipe, $y'$.

It will be noticed that this apparatus is perfectly automatic, and only requires the regular supply of mash to the vessel G, the good supply of steam to the chamber 1 of the vessel A, and the regular supply of water to the rectificators, dephlegmator, and condenser.

No attention is required except the judicious opening of the slides $e$ and $g'$, and of the valves $g$ $g$.

I claim as new, and desire to secure by Letters Patent—

1. The boiler A of a still, when subdivided into a series of chambers, one above the other, these chambers being respectively connected with each other by means of the pipes B and C, and provided with slides $e$, as set forth.

2. Connecting the valves $g$, that are in the discharge-pipes $f$ of the boiler A, all by one rod, E, as described for the purpose specified.

3. Providing the stirrer with two revolving disks, H H, made as described.

4. The arrangement and combination of the vessels G, T, V, which contain the stirrers H, all made and operating substantially as herein shown and described.

5. Conveying the vapors from the boiler A to the stirring-apparatus, so that no steam is required in the latter, as specified.

6. The dephlegmator O, when composed of a series of separate parts or vessels, $p$, $q$, $r$, each having two compartments, $w$ and $x$, and all connected with each other by means of pipes P, all made and operating substantially as herein shown and described.

7. The arrangement and combination, in one distilling-apparatus, of the boiler A, stirring-vessel G T, stirrers H, rectificators J, L, N, dephlegmator O, and cooler S, all made and operating substantially as herein shown and described.

DUBY GREEN.

Witnesses:
 FRANK BLOCKLEY,
 ALEX. F. ROBERTS.